July 12, 1927.
R. E. FLANDERS
THREADING TOOL
Filed June 13, 1925
1,635,179
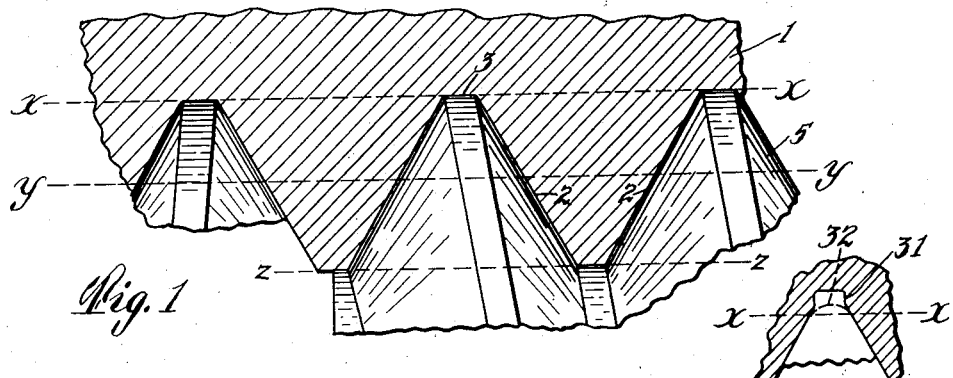
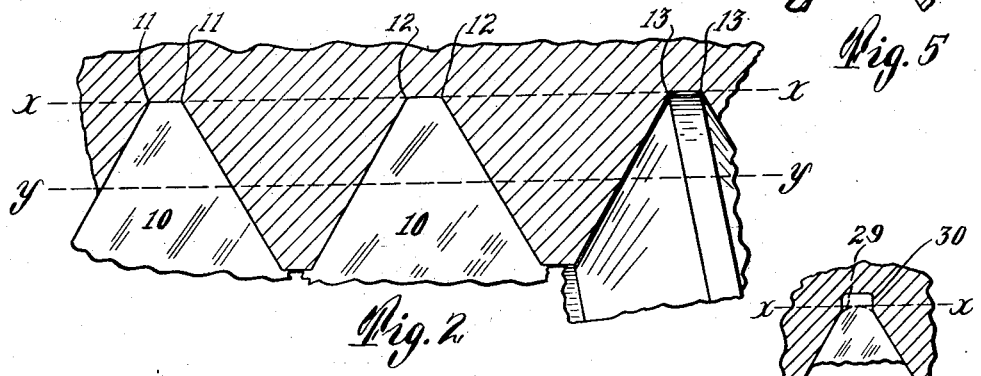
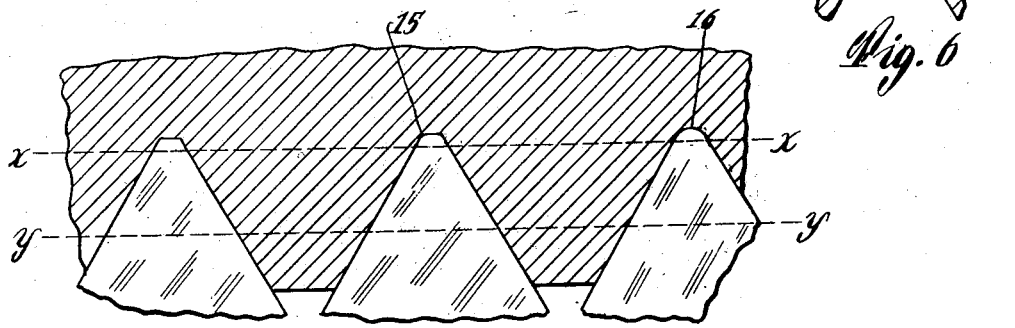
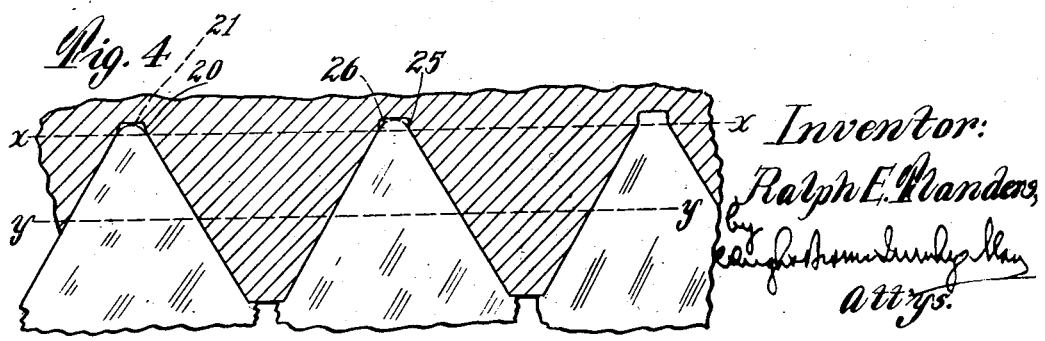
Inventor:
Ralph E. Flanders,
by
attys.

Patented July 12, 1927.

UNITED STATES PATENT OFFICE.

RALPH E. FLANDERS, OF SPRINGFIELD, VERMONT, ASSIGNOR TO JONES & LAMSON MACHINE COMPANY, OF SPRINGFIELD, VERMONT, A CORPORATION OF VERMONT.

THREADING TOOL.

Application filed June 13, 1925. Serial No. 36,730.

This invention relates to taps and other threading tools and has for its object to materially increase their useful life so that a much greater wear may occur before the threads cut thereby will refuse a master gage.

For the purpose of illustration, this invention will be more fully described in connection with the production of United States standard threads, though it should be recognized that it is applicable to any form of threads, and with reference to the accompanying drawings, in which—

Figure 1 is a fragmentary cross section through a portion of a basic or theoretical form of nut with a basic or theoretical screw engaging it.

Figure 2 is a similar view of the nut illustrating the contour cut after a tool of theoretically correct contour has been in use for different periods of time.

Figure 3 is a similar view illustrating one method of prolonging the life of the cutting tool and showing the wear thereon.

Figure 4 is a similar view illustrating a modified construction according to this invention.

Figures 5 and 6 are detail sections illustrating slightly different constructions.

Referring to Figure 1 it will be seen that the nut 1 has threads formed therein having their flanks 2 inclined to each other at an angle of 60°, and that the top and bottom of the threads are flattened off or truncated as at 3 to a width equal to ⅛ of the pitch. The screw 5 engaging with the nut is formed complemental to the nut. The dotted line x—x represents the nominal or basic major diameter of the thread, the line y—y the basic pitch diameter, and the line z—z the basic minor diameter of the thread. If in cutting the threads in the nut a tool having its end shaped exactly in accordance with the desired contour as shown at 10 in Figure 2 is employed, after a few minutes of cutting the corners adjacent to its apex, as at 11, become rounded over as shown at 12 in Figure 2, this rounding over increasing as the tool continues in use until it becomes quite marked as shown at 13 in Figure 2. It is only a short time before this rounding over is sufficient to cause the nut to reject a standard screw or gage having the apex of its threads of the correct contour as shown for example in Figure 1.

In order to obviate this difficulty of the wear of the tool soon rendering its cutting insufficient to receive the master gage, it has been customary to prolong the apex of the tool beyond the major diameter x—x, as shown in Figure 3, so that the rounding of the apex due to wear on the tool may be quite considerable, as shown progressively at 15 and 16 in Figure 3, before it affects the cutting of any portion of the thread which is engaged by the thread of the standard gage. After a time, however, it does become rounded to such an extent that the thread cut thereby will reject the standard gage.

According to the present invention, the apex of the tool is prolonged beyond the major diameter but instead of being prolonged in line with its flanks it is prolonged along lines making a more acute angle with each other than these flanks as shown in Figure 4 at 20, the angle between the side of this prolongation being therein shown as approximately 30°. The wear on this extension may thus be much more extensive than on the extension shown in Figure 3 by the dotted line 21, before it has any effect on that portion of the thread which is engaged by the standard gage. By forming this angle of the extension more acute than that of the flanks of the thread to be made, the tool end is much widened and therefore much more tool material will have to be worn off before the wear extends to a point below the basic major diameter, causing the gage traveling in the path made thereby to be rejected. If desired, the sides of this extension could be made substantially parallel as shown at 25 in Figure 4, in which case permissible wear would extend to the dotted line 26. If desired, the modified outline of this extension could be carried to a point slightly below the basic major diameter as shown in Figure 6 at 30, thus further increasing the tool stock which might be worn away without causing a standard screw or gage to be rejected, as shown by dotted line 29. The threads at the major diameter would then at first be cut somewhat larger than the tops of the threads of the standard screw or gage, but if this is not done to too great an extent, the usefulness or reliability of the threaded hole will not be affected to any practicable extent. If desired also the modification of the apex of the tool might be entirely above the basic major diameter as shown at 31 in Figure 5, in which case permissible wear would extend to the dotted line 32. The effect of the additional material in each of the constructions shown is further intensified by the fact that the pitch diameter of the tap or internal threading tool is not made basic but slightly above basic within the necessary tolerance limits to allow for wear on the flanks as well as on the points.

While the tool has been shown in connection with the production of the threads of a nut, of course it could be employed similarly to the production of the threads of a screw, the modified extension of the tool end then extending below the minor diameter of the thread of the engaging nut rather than above the major basic diameter. For the purposes of this application, therefore, the term "extreme diameter" is intended to cover both the basic major diameter in the case of a nut and in the case of a screw the minor diameter of its engaging nut, whether or not this is the minor basic diameter. In each instance, however, the portion of the tool modified in shape substantially, i. e. beyond the usual tolerance limits, from that of a section of the member which is to engage in the path cut, is at the apex only of the tool.

Having thus described certain embodiments of this invention, it should be evident to those skilled in the art that various changes and modifications may be made therein without departing from its spirit or scope as defined by the appended claims.

I claim:

1. A thread cutting tool having its apex formed at a more acute angle than the flanks of adjacent threads to be cut.

2. A thread cutting tool having its apex formed at a more acute angle than the flanks of adjacent threads to be cut and extending beyond the extreme diameter of said thread.

3. A thread cutting tool having a portion at its apex only substantially wider than a corresponding portion of the thread engageable in the path cut by said tool.

4. A thread cutting tool having a portion at its apex only substantially wider and longer than a corresponding portion of the thread engageable in the path cut by said tool.

5. A thread cutting tool having a portion at its apex only substantially wider and longer than a corresponding portion of the thread engageable in the path cut by said tool, part of said wider portion lying within the extreme diameters of said thread.

In testimony whereof I have affixed my signature.

RALPH E. FLANDERS.